United States Patent [19]
Meyer et al.

[11] Patent Number: 5,765,457
[45] Date of Patent: Jun. 16, 1998

[54] BRAKE LATHE WITH DISPLAY

[75] Inventors: Thomas A. Meyer, Ballwin; Steven K. Molbach, Manchester, both of Mo.

[73] Assignee: Hunter Engineering Company, Bridgeton, Mo.

[21] Appl. No.: 601,737

[22] Filed: Feb. 15, 1996

[51] Int. Cl.$^6$ ...................................... B23B 5/02
[52] U.S. Cl. ............................. 82/112; 82/128
[58] Field of Search .................... 82/1.11, 112, 128; 408/9

[56] References Cited

U.S. PATENT DOCUMENTS

| | | | |
|---|---|---|---|
| 4,510,828 | 4/1985 | Bogaerts et al. | 82/112 |
| 4,523,499 | 6/1985 | Aldridge | 82/112 |
| 4,689,890 | 9/1987 | Nishina | 33/504 |
| 4,726,260 | 2/1988 | Lovrenich et al. | 408/9 X |
| 4,774,753 | 10/1988 | Holy et al. | |
| 4,974,164 | 11/1990 | Lewis et al. | 364/562 |
| 5,054,918 | 10/1991 | Downing et al. | |
| 5,099,728 | 3/1992 | Thiem | 82/112 |
| 5,208,767 | 5/1993 | George-Kelso et al. | |
| 5,279,192 | 1/1994 | Hartman | 82/112 |
| 5,419,222 | 5/1995 | Bieg | 82/1.11 |
| 5,499,563 | 3/1996 | Hansen | 82/112 |

*Primary Examiner*—Daniel W. Howell
*Assistant Examiner*—Henry W. H. Tsai
*Attorney, Agent, or Firm*—Polster, Lieder, Woodruff & Lucches

[57] ABSTRACT

A brake lathe includes a set of rotor cutting bits and a drum cutting bit. Each bit has associated therewith an encoder for measuring the displacement of the bit. The displacements as measured by the encoder are used by a controller to digitally determine various parameters such as absolute thickness of a rotor being lathed, the depth of cut into the rotor, absolute internal diameter of a drum being lathed, and the depth of cut into the drum. The lathe includes a display for displaying the values of the parameters. The lathe includes a calibration mode for calibration of either the rotor cutting or the drum cutting function of the lathe as desired.

49 Claims, 4 Drawing Sheets

BRAKE LATHE WITH DISPLAY

BACKGROUND OF THE INVENTION

This invention relates to the field of brake lathes, and more particularly to the digital measurement and display of relevant brake lathe parameters such as thickness and depth of cut.

Presently available brake lathes perform their fundamental function of cutting brake drums and rotors well, but they could be improved. For example, the presently available equipment generally uses analog scales associated with control knobs to assist the user in setting parameter such as depth of cut. These scales are typically difficult to read and, therefore, result in reduced accuracy. Presently available systems could also be improved by including a system for digitally determining various parameters such as rotor thickness and drum thickness, since these parameters are critical in determining whether the lathing operation should even be attempted. But present systems lack this capability. Current brake lathe systems also lack the ability to accurately define the position in free space of the cutting bits, which would be very useful in measuring the relevant parameters.

Various digital measuring devices are available which would address some of these problems, but they are not believed to be particularly relevant to the brake lathe art. For example, U.S. Pat. No. 4,689,890 to Nishina discloses a digital display measuring apparatus which measures the displacement of a contact point by an object. It appears to be limited to referencing only one point on any object, and does not teach measuring the width or thickness of the object in free space.

Similarly, U.S. Pat. No. 4,774,753 relates to a measuring device for a machine tool which uses a separate arm which is moved by the user to various positions on the workpiece to perform the measurements. This arm does not appear to be associated with the cutting surfaces of the machine tool. Moreover, the reference teaches away from measuring a diameter using a single sensor referenced to an absolute calibration point. The '753 patent also appears to be silent concerning any particular digital display of the measurements.

U.S. Pat. No. 4,974,164 is directed to a digital measuring and proportioning instrument which is hand-held, and hence appears to be of little applicability to brake lathes. In addition, it appears to have no teaching of contacting an object with a cutting bit to measure parameters of the object.

U.S. Pat. No. 5,208,767 concerns a displacement measuring apparatus, particularly an electronic tape measure. The tape measure would appear to be of limited accuracy in the brake lathe application.

There is one patent, U.S. Pat. No. 5,054,918, which teaches the use of optical sensing in connection with brake lathes and the display of the resulting data. See FIGS. 3 and 8A of the U.S. Pat No. 5,054,918 patent. This optical system, however, appears to require an uninterrupted view of the brake rotor and does not use the actual cutting bits of the brake lathe in the measuring process.

SUMMARY OF THE INVENTION

Among the various objects and features of the present invention may be noted the provision of a brake lathe system which provides accurate depth of cut settings.

A second object is the provision of such a system which digitally determines in free space the width or thickness of a brake part to be lathed.

A third object is the provision of such a system which displays desired parameters, such as rotor thickness or drum thickness, or depth of cut, as requested by an operator.

A fourth object is the provision of such a system which is relatively easy to use and thereby facilitates the lathing process.

A fifth object is the provision of such a system which is usable with both rotor cutting bits and drum cutting bits.

A sixth object is the provision of such a system which uses the cutting bits of the brake lathe as part of the measuring device.

Other objects and features will be in part apparent and in part pointed out hereinafter.

Briefly, in a first aspect of the present invention a brake lathe includes two rotor cutting tips, at least one sensor for each rotor cutting tip for measuring distance traveled by the corresponding rotor cutting tip, a controller for computing the distance between the rotor cutting tips from the distances of travel measured by the sensors, and a display responsive to the controller for displaying the distance between the rotor cutting tips.

In a second aspect of the present invention, a brake lathe includes a drum cutting tip, at least one sensor for measuring distance travelled by the drum cutting tip, a controller for computing the position of the drum cutting tip with respect to a reference point from the distance travelled by said tip as measured by said sensor, and a display responsive to the controller for displaying said position of the drum cutting tip with respect to the reference point.

In a third aspect of the present invention a brake lathe includes at least one cutting tip, a mechanism for moving the cutting tip into a cutting position for cutting a brake element such as a rotor or drum, apparatus for determining the location of the cutting position with respect to a predetermined reference position, the distance between the location and the predetermined reference position being the depth of cut, and a display responsive to the determining means for displaying the depth of cut.

In a fourth aspect of the present invention a brake lathe includes a pair of rotor cutting tips, at least one sensor for each rotor cutting tip for measuring distance travelled by the corresponding rotor cutting tip, a controller responsive to the sensors for computing depth of cut for each rotor cutting tip from the measured travel distance for that rotor cutting tip, and a display responsive to the computing means for displaying the depth of cut for each rotor cutting tip.

In a fifth aspect of the present invention a brake lathe includes two rotor cutting tips, at least one sensor for each rotor cutting tip for measuring distance travelled by the corresponding rotor cutting tip, a controller for determining rotor thickness from two measured distances travelled by the rotor cutting tips, and a display responsive to the determining means for displaying rotor thickness of a rotor under test.

BRIEF DESCRIPTION OF THE DRAWINGS

Similar reference characters indicate similar parts throughout the various views of the drawings.

DESCRIPTION OF THE PREFERRED EMBODIMENT

Figure 1:
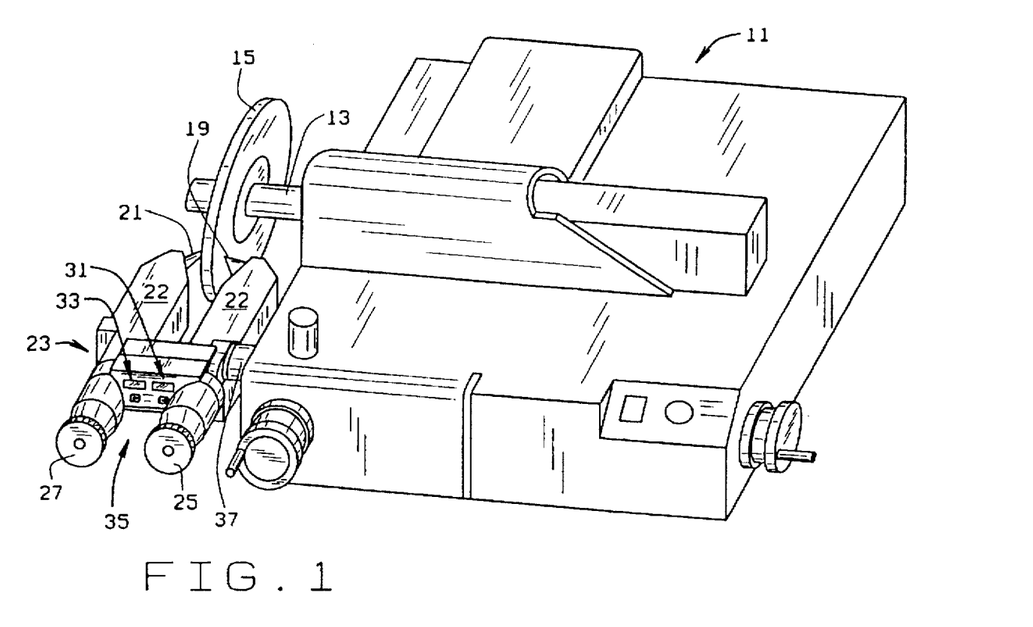
FIG. 1 is a perspective of a brake lathe of the present invention in its configuration to cut a brake rotor.

Turning now to the drawings, a brake lathe 11 of the present invention is shown in FIG. 1. Brake lathe 11 differs from conventional brake lathes in two basic respects: the display, described below, and the use of the cutting bits and associated structure to measure relevant parameters such as rotor thickness or drum diameter, for example. The structure of brake lathe 11 is, therefore, not described in detail except where necessary to illustrate the differences from existing lathes.

Lathe 11 includes a spindle shaft 13 on which a rotor 15 (FIG. 1) or a drum 17 (FIG. 2) may be mounted in conventional manner for rotation by the lathe. In the present invention two rotor cutting bits 19, 21 are held in place by a pair of arms 22 of a housing 23. Housing 23 also has mounted thereto a pair of rotatable knobs 25, 27 which are operatively connected to rotor cutting bits 19, 21 respectively so that rotation of a knob causes a corresponding change in the position ("in" or "out" with respect to the rotor) of the associated bit.

Between knobs 25, 27 are located a first pair of displays 31, 33 disposed on a slanted upper surface of the housing so as to be visible to the user during use of the lathe as shown in FIG. 1. An additional display 35 is disposed on the under slanted surface of the housing. It is preferred that displays 31, 33 and 35 be digital rather than analog displays, although many of the advantages of the present invention may also be implemented using analog displays. Housing 23 is mounted on a rotatable bar 37 so that the entire housing can be rotated from the position shown FIG. 1 to that shown in FIG. 2. In the FIG. 2 orientation, digital display 35 is positioned so as to be readily visible to the user.

Figure 3:
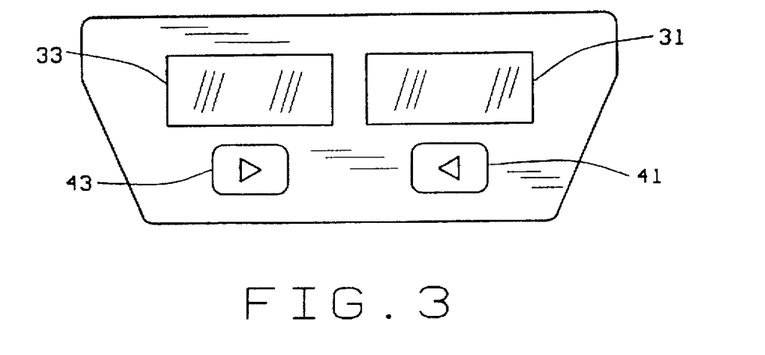
FIG. 3 is an enlarged view of a rotor display panel of the brake lathe of FIG. 1.

As shown in FIG. 3, displays 31, 33 are positioned above corresponding membrane switches 41, 43 which the user may use to provide signals to the control circuitry, discussed below. (Of course, switches other than membrane switches may be used if desired). Specifically, switches 41, 43 when pressed function to signal the control circuitry that the corresponding cutting bit is at its "zero" position. Displays 31 and 33 are preferably four- or five-segment displays, preferably with a "minus" indication. The particular number of digits depends upon the accuracy of measurement desired. Although the various switches described herein are referred to as "membrane switches," it should be understood that any type of switch suitable for brake lathe conditions could be used instead.

Figure 2:
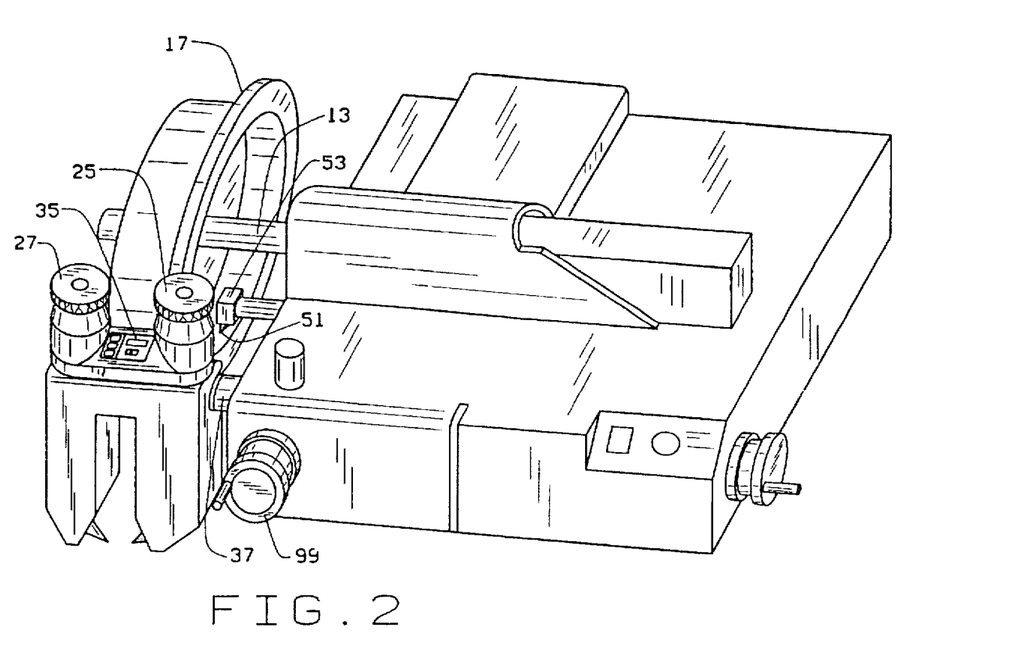
FIG. 2 is a perspective view similar to FIG. 1 in its configuration to cut a brake drum.
Figure 4:
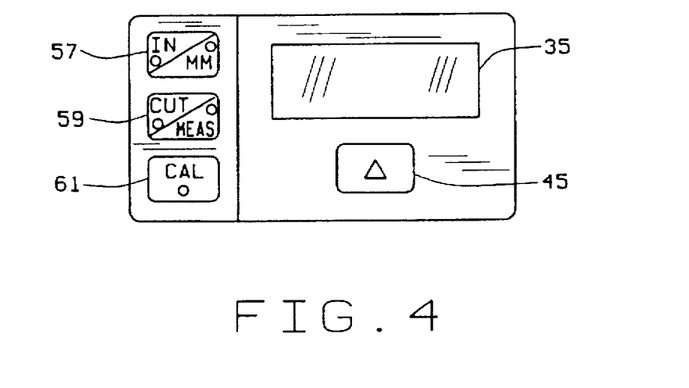
FIG. 4 is a view similar to FIG. 3 of a drum display panel of the brake lathe of FIG. 1.

It should be understood that membrane switches 41, 43 are not by themselves sufficient to provide the control circuit with all the desired information. Thus, as shown in FIG. 4, drum display 35 has associated therewith a third "zero" membrane switch 45, for signalling when the drum cutting bit 51 is at its "zero" position. (Drum cutting bit 51, shown in FIG. 2, is disposed on a movable arm 53 which can be controllably moved longitudinally to engage desired portions of drum 17 for performing conventional lathing operations on the drum. The radial movement of drum bit 51 with respect to spindle shaft 13 is sensed by an encoder, as described below, to determine the position of the cutting bit with respect to an absolute reference point.)

In addition to membrane switch 45, display 35 has associated therewith a set of three additional membrane switches 57, 59, 61, labeled "in/mm", "cut/meas", and "cal" respectively. Switch 57 is used to signal the control circuitry as to the units in which the values should be displayed, inches or millimeters. Switch 59 is a mode switch, used to switch the system between a cutting mode in which depth of cut is the displayed parameter, and a measuring mode in which rotor thickness or drum diameter is displayed. Switch 61 is used to put the control circuitry in a calibration mode, described below for both rotor cutting calibration and drum cutting calibration.

Figure 5:
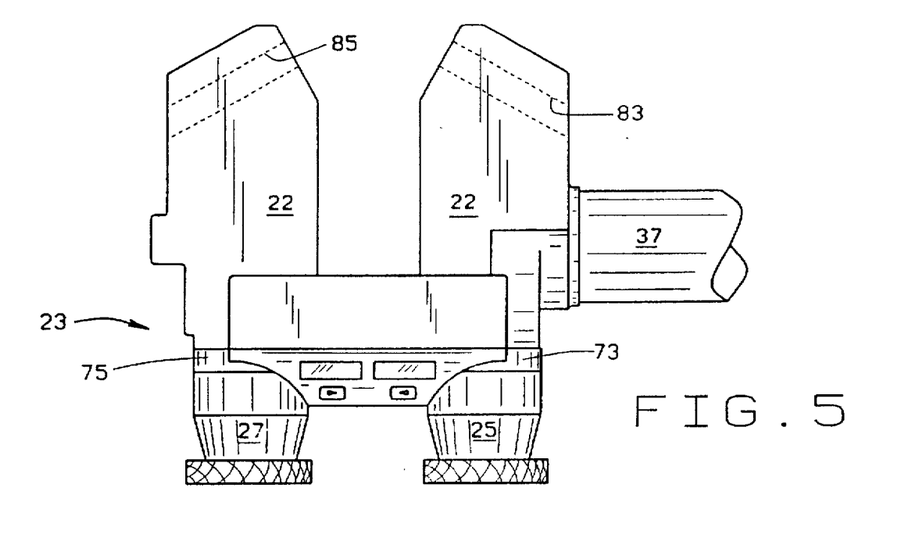
FIG. 5 is a top plan of a cutter bar housing of the brake lathe of FIG. 1.
Figure 6:
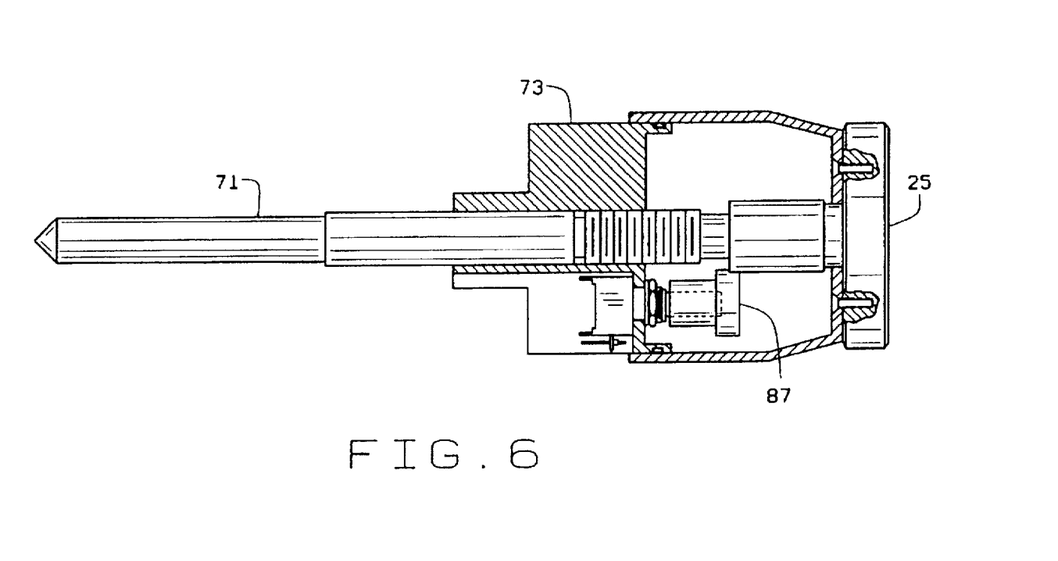
FIG. 6 is a sectional view of a rotor cutter bit adjustment mechanism used in the brake lathe of FIG. 1.

Housing 23 is shown in somewhat more detail in FIG. 5. In this view, the bezel with the slanted surfaces which hold the digital displays is removed for clarity to reveal the basic structure of the housing. Knobs 25, 27 are each attached to a corresponding shaft 71, discussed below in connection with FIG. 6, for rotating the shafts individually as desired. Specifically, knobs 25, 27 each rotate with respect to a corresponding cylinder 73, 75, which cylinders are fixed with respect to arms 22. Each knob has an encoder associated therewith (a typical encoder is shown in FIG. 6, and the electrical connection of the encoders to the control circuitry is described below).

The rotation between each knob and its associated cylinder is detected by its associated encoder and that information is supplied to the control circuitry. Specifically, rotation of knob 25 with respect to cylinder 73 causes the associated shaft 71 to move longitudinally in its associated arm 22. As can be seen in FIG. 6, shaft 71 is fixedly connected to rotate with its associated knob, in this case knob 25. Each shaft is threaded, with each cylinder having corresponding threads, so that this rotation is translated into longitudinal movement of the corresponding shaft. The shafts of each knob extend through longitudinal bores in each arm (not shown) and terminate in a corresponding transverse bore 83, 85. Rotor cutting bit 19 is disposed in bore 83 such that movement of the rightmost shaft 71 further into bore 83 causes bit 19 to be forced radially inwardly toward rotor 15, while the opposite movement of the shaft causes bit 19 to be move radially outwardly away from rotor 15. Similar movement of the leftmost shaft 71 by knob 27 causes similar movement of cutting bit 21 radially inwardly and outwardly. Rotation of shaft 71 with respect to cylinder 73 is sensed by an encoder 87, and the resulting signal applied to the control circuitry. It is preferred that the encoder be a rotary-type encoder, although the particular type of encoding system is not critical, so long as it is capable of functioning reliably in the harsh brake lathe environment. It should be understood that a similar encoder 92 is provided for measuring radial movement of the drum bit 51.

Figure 7:
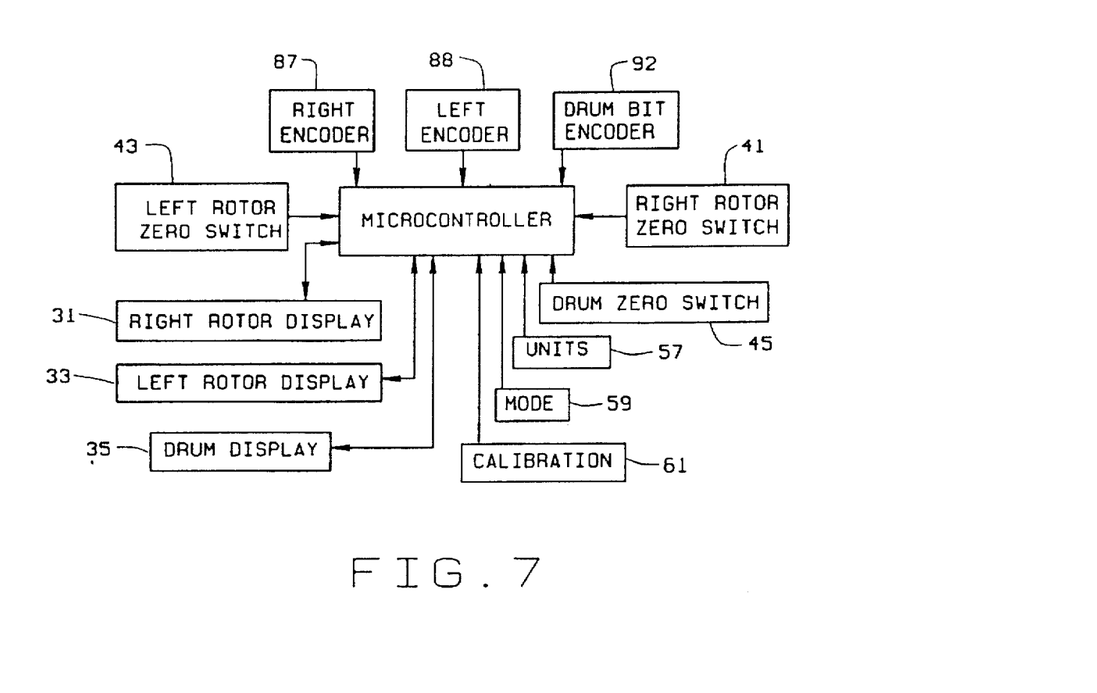
FIG. 7 is a block diagram of the electronic circuitry of the brake lathe of FIG. 1.

Turning to FIG. 7, the control circuit of the present invention is preferably embodied in a microcontroller 95 programmed to accomplish the functions described herein. Of course, other circuitry could be used as desired or required by the particular components being used. Microcontroller 95 receives inputs from the various encoders and switches, counts, computes and stores the encoder inputs, and controls the displays accordingly, as set out in detail below.

Whether brake lathe 11 is being used on a rotor (FIG. 1) or a drum (FIG. 2), the system must first be calibrated. (Calibration is not required before each lathing operation. Rather, it is a periodic function to be performed. When the encoders used are not absolute position encoders, it is necessary to calibrate each time power is restored to the brake lathe.). In calibrating the rotor cutters (bits 19 and 21), the first step is to mount a calibration unit onto the spindle 13. Such a calibration unit resembles rotor 15, but is manufactured with precise, known dimensions. After the calibration unit is mounted, housing 23 is swung to the position shown in FIG. 1 in which the rotor cutting tips 19, 21 are located on opposite faces of the rotor calibration unit. With the spindle stopped (control of rotation of the spindle is a standard function of brake lathes which is not described in detail herein), knob 27 is rotated until left rotor tip 21 just touches the left face of the calibration unit. The user at this point in the calibration process presses calibration switch or button 61 to signal to the microcontroller to enter the calibration mode. Then the user presses the left rotor zero switch 43 to signal the microcontroller to store the value corresponding to the output of left encoder 88. This is the left calibrated absolute zero value. Knob 25 is then rotated to move rotor cutting bit 19 until it just touches the right face of the calibration unit. The user then presses the right rotor zero switch 41 to store the right calibrated absolute zero value. The user exits the calibration mode by pressing calibration switch 61 again.

Similarly, to calibrate the drum cutter, a drum calibration unit (not shown, but of accurate and predetermined size and dimensions) is installed on spindle 13. The housing 23 is rotated so as to have the rotor cutting tips facing downwardly as shown in FIG. 2. This allows the drum cutter tip 51 to extend out of the body of the brake lathe. With spindle 13 stopped, the user moves the drum cutter tip 51 so as to locate it at the middle of the face of the drum calibration unit. A knob 99 associated with drum bit encoder 92 is then rotated to "dial" the drum cutter tip 51 until it just touches the back face of the drum calibration unit. The calibration mode is entered by pressing calibration switch 61. The user then presses drum zero button 45 to have the microcontroller store the drum calibrated absolute zero value derived from the output of encoder 92. The user exits the calibration mode by pressing calibration switch 61 a second time.

Once the brake lathe is calibrated, it may be used in several ways. A primary way in which the lathe is used is to cut rotors, such as rotor 15 shown in FIG. 1. The first step in this process is to mount the rotor on spindle shaft 13 as shown. The user then swings the housing to the position shown in FIG. 1 in which the rotor cutting tips 19, 21 are disposed on either face of rotor 15, making sure to leave enough room to move the bits as necessary. With spindle shaft 13 turning, the user "dials" left rotor tip 21 into the deepest groove on the left side of the rotor face and stops when tip 21 begins to scratch the rotor face. The user then presses left rotor zero switch 43, which signals the microcontroller to reference all measurements to this zero position. The user then backs tip 21 away from the left rotor face and repeats the above steps for rotor cutting tip 19, ending the process by pressing right rotor zero switch 41. This stores the corresponding value as the zero position for the right rotor face. With both tips drawn back, the housing is positioned so that the rotor cutter tips are at the furthest point towards the center of the rotor on the rotor face. Knobs 25 and 27 are then rotated until each display 31, 33 reads "zero." From that point, the knobs are rotated additional amounts until the desired depth of cut is displayed for each rotor face. The user then engages the conventional rotor feed motor (not shown).

The steps in the immediately preceding paragraph can also be used to determine rotor thickness. Instead of drawing back the cutting tips, however, the user leaves tips 19, 21 in their positions in the deepest grooves in their respective faces and presses mode selection switch 59 to select the measurement mode of operation. The microcontroller then computes the thickness of the rotor from the measured positions (taking into account the known thickness of the rotor calibration unit and the differences in measurements taken on the actual rotor with respect to those taken on the calibration unit). The microcontroller then causes the thickness (i.e., the distance between the two rotor cutting tips) to be displayed in display 31, instead of the "zero" which would otherwise be displayed. This measurement can be used to determine the maximum depth of cut allowed before discarding rotor 15.

The calibrated system may also be used to measure axial runout of the rotor. Axial rotor runout may be due to either a warped rotor or improper mounting of the rotor on the spindle 13. To measure axial runout of the rotor, the rotor 15 is mounted on spindle 13 and housing 23 moved to the position shown in FIG. 1. With the spindle stopped, knob 25 is rotated until cutter tip 19 touches the lowest point on the right face of the rotor. The user presses the right rotor zero switch 45 to cause the corresponding position value to be stored by the microcontroller as the "zero" value. The right rotor tip 19 is then backed away from the rotor face and the housing moved so that the right rotor tip is disposed above the highest point on the right face of the rotor. Knob 25 is then rotated again until rotor tip 19 just touches the highest point on the right face of the rotor. The value displayed on display 31 at this point is the axial runout of the rotor, since the system was "zeroed" at the lowest point on the rotor and the final reading taken at the highest point. Of course, rotor runout could be measured instead on the left side of the rotor if desired.

The functioning of brake lathe 11 when cutting a drum is done with the housing in the position shown in FIG. 2. In this position, the relevant drum display 35 is readily visible. To cut drum 17, the system must first be calibrated as described above. The drum is mounted on spindle 13 and the housing 23 is rotated to the position shown in FIG. 2 so that the drum cutter tip 51 may be extended. With spindle 13 turning, the user moves drum cutter tip 51 so as to position it at the middle of the drum face. Knob 99 is then rotated to "dial" the drum cutter tip 51 into the face of the drum until it begins to scratch the drum. This is the "zero" position for the drum. The user presses drum zero switch 45 to cause microcontroller 95 to reference all subsequent measurements to this zero point. Knob 99 is then rotated to withdraw cutting tip 51 from the drum face. The tip, in the radially withdrawn position, is then extended fully into the drum (to the left from the position shown in FIG. 2). Knob 99 is then rotated again until "zero" is displayed on drum display 35. Thereafter, knob 99 is rotated an additional amount until the desired depth of cut is displayed on display 35. The user then engages the drum feed motor to begin the lathing process itself.

Instead of depth of cut, the preceding procedure may be used to determine the internal diameter of the drum. Instead of backing the tip 51 away from the drum zero position, as in the previous procedure, the user leaves the tip touching the drum face. At this point the position of the drum cutting tip is a direct measurement of the internal drum diameter. The value corresponding to this position when compared to an absolute reference point value (corresponding to the axis of spindle 13) is the drum diameter. The user presses mode switch 59 to cause the comparison to be made and the display of the internal drum diameter on display 35. This measurement can be used to determine the maximum depth of cut allowed before discarding drum 17.

The calibrated system may also be used to measure drum ovality (also called radial runout). This runout may result from either a warped drum or an incorrectly mounted drum. To determine radial runout, the drum is mounted as shown in FIG. 2, with housing 23 rotated downwardly as shown. With the spindle 13 stopped, the drum cutter tip 51 is moved by the user to locate it at the middle of the drum face. Knob 99 is then rotated to "dial" the cutter tip until it just touches the point on the drum face that is furthest from the spindle. The user then presses the drum zero switch 45, which causes the microcontroller to store the corresponding position value as a "zero" point. The user then backs the drum cutter tip 51 away from the drum face and positions the tip over the portion of the face which is closest to the spindle. Knob 99 is then rotated by the user to move the drum cutter tip until it contacts the point on the face closest to the spindle. The number displayed in drum display 35 at this point is the radial runout of the drum, since it is referenced to the point furthest away from the spindle.

Figure 8:
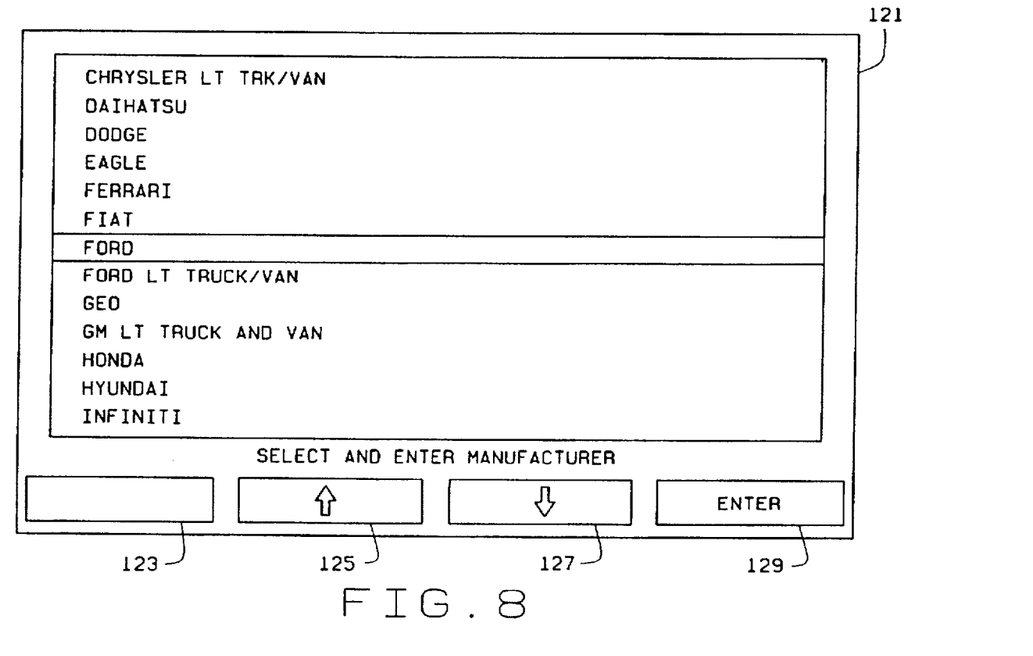
FIG. 8 is an elevation of an alternative display usable with the present invention, illustrating the selection of particular makes of vehicles.
Figure 9:
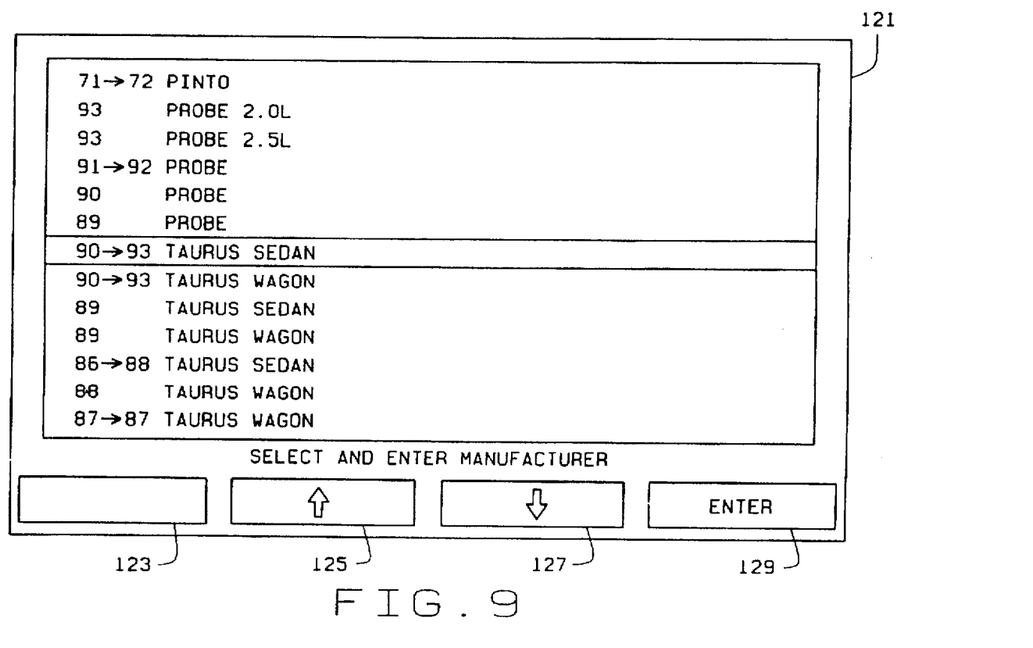
FIG. 9 is an elevation of the display of FIG. 8, illustrating the selection of a particular model of vehicle.

Turning to FIGS. 8 and 9, there is shown an alternative display 121 usable with the brake lathe of the present invention. In this embodiment, a series of switches 123, 125, 127, and 129 are used by the operator to manually select and signal to the microcontroller 95 the particular make and model of vehicle whose rotor or drum is being lathed. The microcontroller causes display 121 to display a list of vehicle makes (FIG. 8), and the operator uses switches 125 and 127 to scroll up and down the list until the desired vehicle make is found. Once the correct make is found, the operator signals that fact to the microcontroller using switch 129, the "enter" or "select" switch. Microcontroller 95 in response displays the scrollable screen of FIG. 9, in which a list of vehicle models corresponding to the selected make is displayed. The operator uses switches 125 and 127 to scroll through this list until the desired model is found, at which point switch 129 is used to signal the selected model to the microcontroller.

Microcontroller 95 preferably has drum and rotor specifications stored therein for the various vehicle models. When a rotor or drum measurement is taken as described above, microcontroller 95 compares the measured value with the corresponding specification. If desired, any discrepancy between the measured value and the specification can be displayed to the operator, or a warning can be displayed.

Many brake rotors have a "discard value" printed thereon, which represents a rotor thickness below which the rotor should not be used. In one embodiment of the present invention, it is preferred that the microcontroller include programming for accepting "discard value" manual inputs from the operator. The operator in this embodiment uses the relevant switches to input to the microcontroller the actual discard value printed on the rotor in question. The microcontroller temporarily stores that value and then, during the measurement of rotor thickness discussed above, compares the measured rotor thickness with the discard value. When the rotor thickness is less than the discard value, the microcontroller causes the display of a warning and/or, if a printer is available, causes that fact to be printed on a report.

In view of the above, it will be seen that all the objects and features of the present invention are achieved, and other advantageous results obtained. The description of the invention contained herein is illustrative only, and is not intended in a limiting sense.

What is claimed is:

1. A brake lathe with display comprising:
   two rotor cutting tips;
   for each rotor cutting tip, at least one sensor for measuring linear distance traveled by the corresponding rotor cutting tip;
   control circuitry for computing the distance between the two rotor cutting tips from the distances of travel measured by the sensors; and
   a display responsive to the control circuitry for displaying the distance between the two rotor cutting tips.

2. The brake lathe with display as set forth in claim 1 wherein the sensors are rotary encoders.

3. The brake lathe with display as set forth in claim 1 wherein each rotor cutting tip has associated therewith a displacing mechanism for controllably moving said rotor cutting tip.

4. The brake lathe with display as set forth in claim 1 further including a drum cutting tip and at least one sensor for measuring distance traveled by said drum cutting tip.

5. The brake lathe with display as set forth in claim 4 wherein said rotor cutting tip are disposed in a housing adapted to be rotated out of the path of the drum cutting tip.

6. The brake lathe with display as set forth in claim 1 wherein the control circuitry has a calibration mode.

7. The brake lathe with display as set forth in claim 6 further including user operable means for putting the control circuitry in the calibration mode.

8. The brake lathe with display as set forth in claim 1 wherein the control circuitry has a measuring mode in which the distance between the rotor cutting tips is displayed and a depth of cut mode in which the depth of cut of both rotor cutting tips is displayed.

9. A brake lathe with display comprising:
   a drum cutting tip;
   at least one sensor for measuring linear distance traveled by the drum cutting tip;
   control circuitry for computing the position of the drum cutting tip with respect to a reference point from the distance traveled by said tip as measured by said sensor; and
   a display responsive to the control circuitry for displaying said position of the drum cutting tip with respect to the reference point.

10. The brake lathe with display as set forth in claim 9 wherein the sensors are rotary encoders.

11. The brake lathe with display as set forth in claim 9 wherein the drum cutting tip has associated therewith a displacing mechanism for controllably moving said drum cutting tip.

12. The brake lathe with display as set forth in claim 9 wherein the control circuitry has a calibration mode.

13. The brake lathe with display as set forth in claim 12 further including user operable means for putting the control circuitry in the calibration mode.

14. The brake lathe with display as set forth in claim 9 wherein the control circuitry has a measuring mode in which the distance corresponding to the position of the drum cutting tip is displayed and a depth of cut mode in which the depth of cut of the drum cutting tip is displayed.

15. A brake lathe with display comprising:
   at least one cutting tip;
   at least one sensor for measuring linear distance traveled by the cutting tip;

means for moving the cutting tip into a cutting position for cutting a brake element such as a rotor or drum;

control circuitry for determining the location of said cutting position with respect to a predetermined reference position, the distance between said location and the predetermined reference position being the depth of cut; and a display responsive to the control circuitry for displaying the depth of cut.

16. The brake lathe with display as set forth in claim 15 wherein the sensors are rotary encoders.

17. The brake lathe with display as set forth in claim 15 wherein each rotor cutting tip has associated therewith a displacing mechanism for controllably moving said rotor cutting tip.

18. The brake lathe with display as set forth in claim 15 wherein the control circuitry has a calibration mode.

19. The brake lathe with display as set forth in claim 18 further including user operable means for putting the control circuitry in the calibration mode.

20. The brake lathe with display as set forth in claim 15 wherein the control circuitry has a measuring mode in which a distance which is a function of the position of said cutting tip is displayed.

21. A brake lathe with display comprising:

a pair of rotor cutting tips;

for each rotor cutting tip, at least one sensor for measuring linear distance traveled by the corresponding rotor cutting tip;

control circuitry responsive to said sensors for computing depth of cut for each rotor cutting tip from the measured travel distance for that rotor cutting tip; and a display responsive to the control circuitry for displaying the depth of cut for each rotor cutting tip.

22. The brake lathe with display as set forth in claim 21 wherein the sensors are rotary encoders.

23. The brake lathe with display as set forth in claim 21 wherein each rotor cutting tip has associated therewith a displacing mechanism for controllably moving said rotor cutting tip.

24. The brake lathe with display as set forth in claim 21 further including a drum cutting tip and at least one sensor for measuring distance traveled by said drum cutting tip.

25. The brake lathe with display as set forth in claim 24 wherein said rotor cutting tip are disposed in a housing adapted to be rotated out of the path of the drum cutting tip.

26. The brake lathe with display as set forth in claim 21 wherein the control circuitry has a calibration mode.

27. The brake lathe with display as set forth in claim 26 further including user operable means for putting the control circuitry in the calibration mode.

28. The brake lathe with display as set forth in claim 21 wherein the control circuitry has a measuring mode in which the distance between the rotor cutting tips is displayed and a depth of cut mode in which the depth of cut of both rotor cutting tips is displayed.

29. A brake lathe with display comprising:

two rotor cutting tips;

for each rotor cutting tip, at least one sensor for measuring linear distance traveled by the corresponding rotor cutting tip;

control circuitry for determining rotor thickness from two measured distanced traveled by said rotor cutting tips; and a display responsive to the control circuitry for displaying rotor thickness of a rotor under test.

30. The brake lathe with display as set forth in claim 29 wherein the sensors are rotary encoders.

31. The brake lathe with display as set forth in claim 29 wherein each rotor cutting tip has associated therewith a displacing mechanism for controllably moving said rotor cutting tip.

32. The brake lathe with display as set forth in claim 29 further including a drum cutting tip and at least one sensor for measuring distance traveled by said drum cutting tip.

33. The brake lathe with display as set forth in claim 32 wherein said rotor cutting tip are disposed in a housing adapted to be rotated out of the path of the drum cutting tip.

34. The brake lathe with display as set forth in claim 29 wherein the control circuitry has a calibration mode.

35. The brake lathe with display as set forth in claim 34 further including user operable means for putting the control circuitry in the calibration mode.

36. The brake lathe with display as set forth in claim 29 wherein the control circuitry has a measuring mode in which the distance between the rotor cutting tips is displayed and a depth of cut mode in which the depth of cut of both rotor cutting tips is displayed.

37. A method of calibrating a brake lathe having an electronic controller, a spindle adapted for mounting brake components, and at least one cutting tip, said method comprising:

setting the electronic controller in a calibration mode;

mounting a calibration unit onto the spindle of the brake lathe, said calibration unit having known dimensions and said calibration unit further representing a predetermined brake component such as a drum or rotor;

moving at least one cutting tip of the brake lathe into contact with the calibration unit;

storing a calibration value in the electronic controller, said calibration value corresponding to the position of the cutting tip in contact with the calibration unit.

38. The method of calibrating a brake lathe as set forth in claim 37 wherein the brake lathe has a pair of cutting tips, said calibration including moving both cutting tips into contact with the calibration unit and storing calibration values for each cutting tip.

39. The method of calibrating a brake lathe as set forth in claim 38 wherein the calibration unit is disposed between said cutting tips so that one cutting tip is moved into contact with a first surface of the calibration unit and the other cutting tip is moved into contact with a second surface of the calibration unit.

40. The method of calibrating a brake lathe as set forth in claim 37 wherein the brake lathe has a drum cutting tip, said calibration including moving said drum cutting tip into contact with the calibration unit and storing the calibration value corresponding to the position of said drum cutting tip.

41. The method of calibrating a brake lathe as set forth in claim 40 wherein the calibration unit is disposed in a position corresponding to that of a drum to be lathed for the obtaining of the calibration value.

42. A brake lathe comprising:

two rotor cutting tips;

for each rotor cutting tip, at least one sensor for measuring distance travelled by the corresponding rotor cutting tip;

control circuitry for determining rotor thickness from two measured distances travelled by said rotor cutting tips, said control circuitry having stored therein rotor thickness specifications;

manually operable means for entering the make and model of the vehicle whose rotor is being lathed;

said control circuitry being responsive to the measured rotor thickness and the make and model of the vehicle to compare the rotor thickness with the rotor thickness specification for the selected make and model of vehicle.

43. The brake lathe as set forth in claim 42 further including a display responsive to the control circuitry for displaying a result of the comparison of the measured rotor thickness with the corresponding specification.

44. A brake lathe comprising:

two rotor cutting tips;

for each rotor cutting tip, at least one sensor for measuring distance travelled by the corresponding rotor cutting tip;

control circuitry for determining rotor thickness from two measured distances travelled by said rotor cutting tips;

manually operable means for entering a rotor discard value corresponding to the rotor being lathed;

said control circuitry being responsive to the measured rotor thickness and the entered rotor discard value to compare the rotor thickness with the rotor discard value.

45. The brake lathe as set forth in claim 44 wherein the control circuitry is responsive to a rotor thickness falling below the entered rotor discard value to issue a warning.

46. A brake lathe comprising:

a drum cutting tip;

at least one sensor for measuring distance travelled by the drum cutting tip;

control circuitry for determining internal drum diameter from the measured distance travelled by said drum cutting tip, said control circuitry having stored therein drum discard specifications which are a function of internal drum diameter and make and model of the vehicle whose drum is being lathed;

manually operable means for entering the make and model of said vehicle whose drum is being lathed;

said control circuitry being responsive to the measured drum internal diameter and the make and model of the vehicle to compare said diameter with the drum discard specification for the selected make and model of vehicle.

47. The brake lathe as set forth in claim 46 further including a display responsive to the control circuitry for displaying a result of the comparison of the measured drum internal diameter with the corresponding specification.

48. A brake lathe comprising:

a drum cutting tip;

at least one sensor for measuring distance travelled by the drum cutting tip;

control circuitry for determining internal drum diameter from the measured distance travelled by said drum cutting tip;

manually operable means for entering a drum discard value corresponding to the drum being lathed;

said control circuitry being responsive to the measured drum internal diameter and the entered drum discard value to compare the drum internal diameter with the drum discard value.

49. The brake lathe as set forth in claim 48 wherein the control circuitry is responsive to a drum internal diameter exceeding the drum discard value to issue a warning.

* * * * *